(12) United States Patent
Mirtorabi et al.

(10) Patent No.: US 7,664,789 B2
(45) Date of Patent: Feb. 16, 2010

(54) METHOD AND APPARATUS TO MINIMIZE DATABASE EXCHANGE IN OSPF BY USING A SHA-1 DIGEST VALUE

(75) Inventors: Sina Mirtorabi, Santa Clara, CA (US); Abhay Roy, Santa Clara, CA (US); Brian E. Weis, San Jose, CA (US); Scott Roy Fluhrer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 11/292,534

(22) Filed: Dec. 2, 2005

(65) Prior Publication Data

US 2007/0127457 A1 Jun. 7, 2007

(51) Int. Cl.
- H04L 12/28 (2006.01)
- G06F 7/00 (2006.01)
- G06F 17/30 (2006.01)
- G06F 15/173 (2006.01)

(52) U.S. Cl. .................. 707/201; 370/395.31; 709/223; 709/242; 707/1

(58) Field of Classification Search ................. 709/223, 709/238, 242; 707/1, 201
See application file for complete search history.

(56) References Cited

U.S. PATENT DOCUMENTS

| | | | | |
|---|---|---|---|---|
| 5,884,328 A | * | 3/1999 | Mosher, Jr. ................. 707/202 |
| 6,876,625 B1 | * | 4/2005 | McAllister et al. .......... 370/221 |
| 7,248,579 B1 | * | 7/2007 | Friedman ..................... 370/389 |
| 2002/0059299 A1 | * | 5/2002 | Spaey ....................... 707/104.1 |
| 2003/0005306 A1 | * | 1/2003 | Hunt et al. ................... 713/181 |
| 2003/0223417 A1 | * | 12/2003 | Higashida .................... 370/389 |
| 2004/0246902 A1 | * | 12/2004 | Weinstein et al. ........... 370/238 |
| 2005/0041676 A1 | * | 2/2005 | Weinstein et al. ........... 370/401 |
| 2005/0265260 A1 | * | 12/2005 | Zinin et al. .................. 370/255 |
| 2007/0019647 A1 | * | 1/2007 | Roy et al. .................... 370/392 |
| 2007/0112880 A1 | * | 5/2007 | Yang et al. .................. 707/201 |

\* cited by examiner

*Primary Examiner*—Dang T Ton
*Assistant Examiner*—Ryan C Kavleski
(74) *Attorney, Agent, or Firm*—Cesari and McKenna, LLP

(57) ABSTRACT

The present invention provides a method of determining whether database located on a first router is synchronized with the database located on a second router by performing a hash function on the values contained in a link state database to derive a SHA-1 digest value. In an embodiment, the digest value is based on LSA type. The digest value is exchanged initially during a database description packet swap between the first router and second router. If the digest values are the same, the databases are already synchronized. The routers thus skip the database description packet exchange of LSAs in the database and go directly to FULL state, indicating full synchronization between databases on the first and second router and announcing adjacency to each other. If the digest differs, normal database description packet exchange is performed as specified in OSPF.

21 Claims, 2 Drawing Sheets

METHOD AND APPARATUS TO MINIMIZE DATABASE EXCHANGE IN OSPF BY USING A SHA-1 DIGEST VALUE

FIELD

The present invention relates broadly to packet switched networks. More specifically, the present invention relates to communication between routers in a packet switched network that use a SHA-1 digest value to minimize database exchange.

BACKGROUND OF THE INVENTION

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). The largest entity within the hierarchy is an autonomous system (AS), which is a collection of networks under a common administration that share a common routing strategy. OSPF is an intra-AS (interior gateway) routing protocol, although it is capable of receiving routes from and sending routes to other ASs. An AS can be divided into a number of areas, which are groups of contiguous networks and attached hosts. Routers with multiple interfaces can participate in multiple areas. These routers, which are called Area Border Routers, maintain separate topological databases for each area. A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common network. The router sends hello packets to its neighbors and receives their hello packets. In addition to helping acquire neighbors, hello packets also act as "keepalives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent. Adjacencies control the distribution of routing-protocol packets, which are sent and received only on adjacencies. Each router periodically sends its LSAs to provide information on a router's adjacencies or to inform others when a router's state changes. By comparing established adjacencies to link states, failed routers can be detected quickly, and the network's topology can be altered appropriately. From the topological database generated from LSAs, each router calculates a shortest-path tree (SPT), with itself as root. The SPT, in turn, yields a routing table.

In Mobile Ad-hoc Networks (MANET), there are highly-meshed connections. Due to prohibitive overhead costs of maintaining many peerings, it is not always desirable to bring up routing peering with all possible visible neighbors. But this results in lost, potentially-usable forwarding paths. There is a need for a solution that does not have to perform a full database exchange, but at the same time assumes the adjacency is synchronized and announces the corresponding link for transit. This would reduce peering overhead, and the many alternate paths could be used, thus more effectively utilizing available network throughput. In the case of OSPF, the use of many alternate paths translates into the ability to announce and use the adjacency (for data plane) without incurring the expense of a full database exchange or handling flooding updates over this adjacency.

In OSPF, before two nodes can announce an adjacency to each other and use their common link for forwarding data, they have to exchange their databases through database description (DD) packets to assure that their databases are synchronized. In situations where nodes already have a synchronized database and establish a new adjacency over a link, they spend some time in exchanging their database even though their database might be already synchronized. This is a time-consuming process that also requires processing resources on two separate routers. As processing resources can be better used for other tasks, there is a heartfelt need to reduce the amount of database exchange to free up processing resources and simplify communication between routers in a network.

SUMMARY OF THE INVENTION

The present invention solves the problems described by comparing databases through a SHA-1 digest value and bypass (or reduce) the DD exchange. This capability is very useful in environment such as MANET.

In one aspect, the present invention provides a method of determining whether a database located on a first router is synchronized with the database located on a second router by performing a hash function on the values contained in a link state database to derive a SHA-1 digest value. In an embodiment, the digest is based on LSA type. The digest value is exchanged initially during a database description packet swap between the first router and second router. If the digest values are the same, the databases are already synchronized. The routers thus skip the database description packet exchange of LSAs in database 216 and go directly to FULL state, indicating full synchronization between databases on the first and second router and announcing adjacency to each other. If the digest differs, normal database description packet exchange is performed as specified in OSPF. In an alternative embodiment, depending on the degree of digest mismatch, only a subset of LSA is exchanged, thus reducing the scope of the DD exchange.

In another aspect, the present invention provides a router configured to determine whether a local database is synchronized with the database located on a second router. The router comprises a communication connection to a network, across which the router communicates with a second router; a database containing link state advertisements, a processor configured to perform a hash function on the contents of the database, wherein the hash function yields a resulting digest value. The processor is configured to communicate the resulting value over the communication connection in the form of a database description packet and also receive a similar database description packet containing a second digest value from the second router, wherein the digest value is calculated in the same manner as the first digest value. The processor is also configured to compare the first digest value with the second digest value, and transition the state of the router to FULL and indicate its adjacency with the second router.

Other features and advantages of the present invention will be realized upon reading the accompanying detailed description, when considered in conjunction with the drawings.

DETAILED DESCRIPTION

Figure 1:
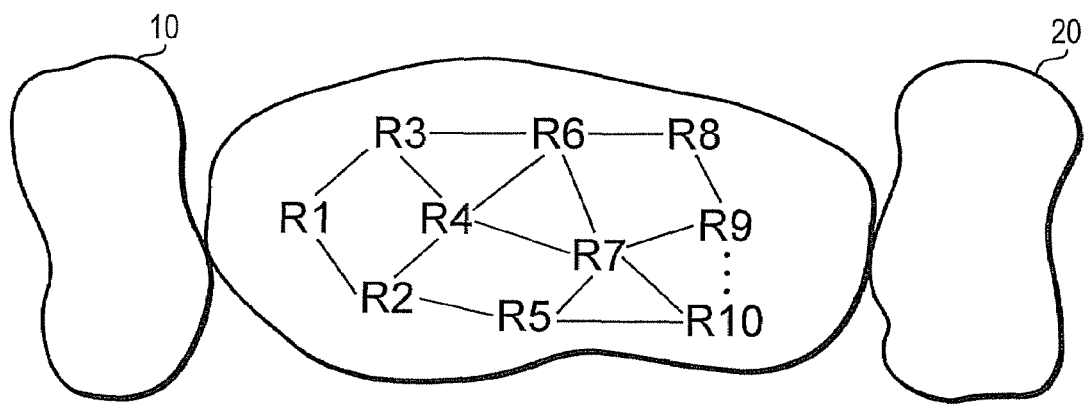
FIG. 1 illustrates a network of routers in accordance with the present invention.

Directing attention to FIG. 1, there is shown an exemplary network of routers in accordance with the present invention. Routers R1-RN function to pass traffic in the form of packetized data between points 10, 20. Points 10, 20 can be individual, end user computer systems, local area networks, wider area networks, and may even be separate computer networks containing additional routers, but in each case data packets are sent through at least some of the routers R1-RN between points 10, 20. While FIG. 1 illustrates a network having a specific number of routers R1-RN, it is to be understood that various configurations of routers can be implemented in accordance with the present invention. Such variations include the number of routers included, as well as the communication medium employed between the routers. Routers R1-RN can communicate with each other over wireless media as well as wired media, as can points 10, 20. While FIG. 1 also shows a specific arrangement of communication connections between routers R1-RN, it is to be understood that not every router is in communication with every neighboring router, and therefore a variety of connection paths between routers of the network may exist.

Figure 2:
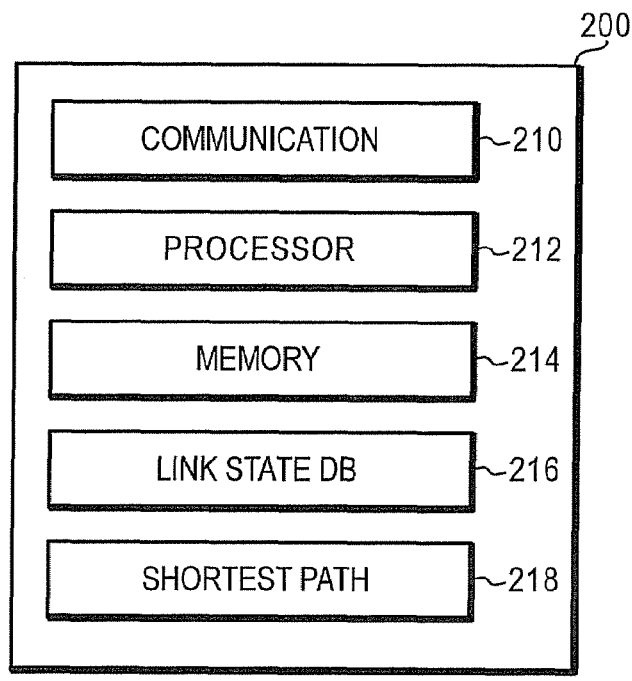
FIG. 2 illustrates in block diagram form the major components of a router in accordance with the present invention.

FIG. 2 illustrates an exemplary embodiment of routers R1-RN. Router 200 includes communication connection 210, processor 212, memory 214, link state database 216, and shortest path data structure 218. Other components, commonly found in routers known to those skilled in the art, are included in router 200, but are not illustrated.

Figure 3:
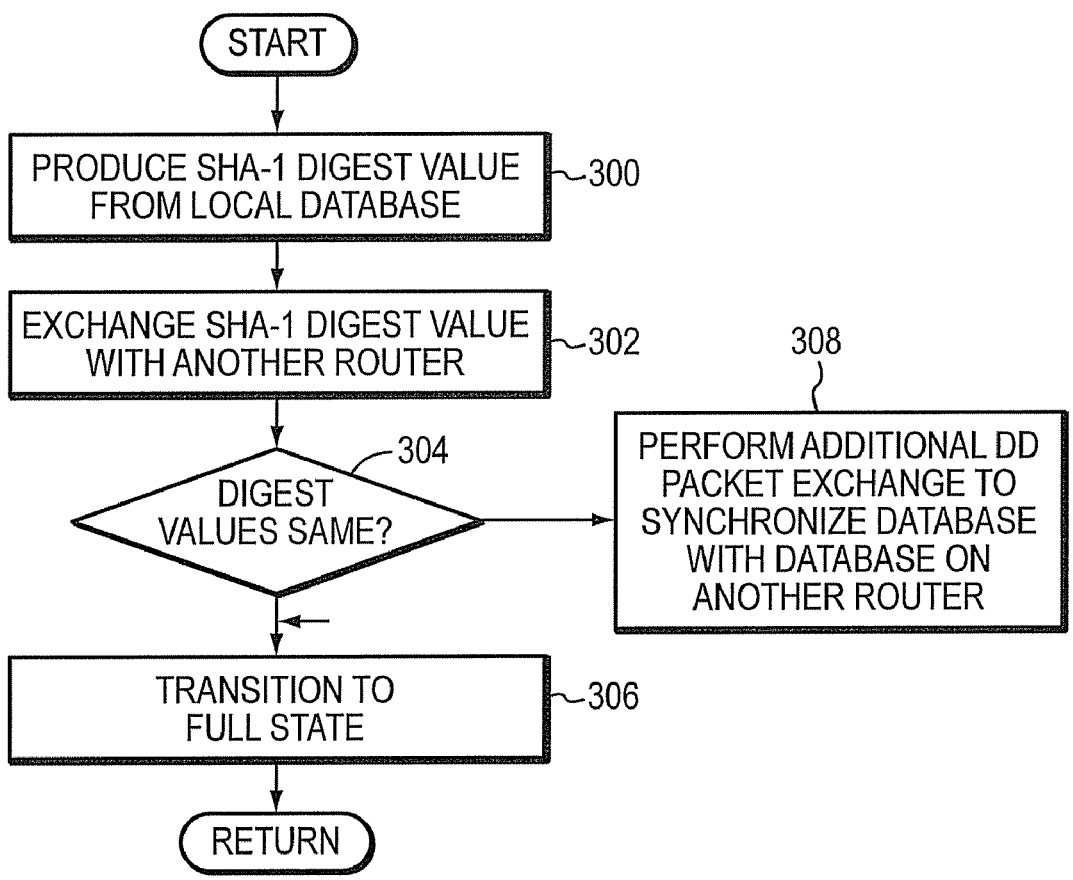
FIG. 3 illustrates in flow diagram form acts performed in accordance with an embodiment of the present invention.

Directing attention to FIG. 3, in order to compare database content without exchanging the actual databases, two routers in the network, for example router R1 and router R2, exchange two values that reflect the contents of their respective databases. In accordance with the present invention, routers R1 and R2 each perform a hash function on the values contained in their respective, local databases 216 to derive a SHA-1 digest value (act 300). This digest value is exchanged initially during DD packet swap between router R1 and R2 (act 302). In an embodiment, the digest is based on LSA type. If the digest values are sufficiently similar (decision act 304), the databases are already synchronized. Control transitions to act 306, where routers R1 and R2 thus skip the DD exchange of LSAs in database 216 and go directly to FULL and announce adjacency to each other. If the digest differs to a sufficient degree, normal DD packet exchange is be performed as specified in OSPF (act 308). In an alternative embodiment, depending on the degree of digest mismatch, only a subset of LSA is exchanged, thus reducing the scope of the DD exchange.

For efficiency, it is important to avoid performing a SHA-1 digest of the entire database just before transmitting it in the DD packet. The router maintains an incremental digest locally. The incremental digest is adjusted as additions and deletions are made to the database. The order of the database additions and deletions must be transitive (i.e., may be done in any order) or the SHA-1 digest value will be skewed. Inputs to the SHA algorithm are in the form of messages of arbitrary numbers of bytes.

The following is a pseudocode example of how to calculate a SHA-1 value in accordance with embodiments of the present invention. In this example, All variables are unsigned 32 bits and wrap modulo $2^{32}$ when calculating.

Initialize variables:
$h0$ := 0x67452301
$h1$ := 0xEFCDAB89
$h2$ := 0x98BADCFE
$h3$ := 0x10325476
$h4$ := 0xC3D2E1F0

Pre-processing:
append a single "1" bit to message
append "0" bits until message length__448__64 (mod 512)
Append length of message (before pre-processing), in bits as 64-bit big-endian integer to message
Process the message in successive 512-bit chunks: break message into 512-bit chunks for each chunk
break chunk into sixteen 32-bit big-endian words $w(i)$, $0 \leq i \leq 15$
Extend the sixteen 32-bit words into eighty 32-bit words:
for i from 16 to 79
    $w(i) := (w(i-3) \text{ xor } w(i-8) \text{ xor } w(i-14) \text{ xor } w(i-16))$ leftrotate 1
Initialize hash value for this chunk:
$a := h0$
$b := h1$
$c := h2$
$d := h3$
$e := h4$
Main loop:
for i from 0 to 79
    if $0 \leq i \leq 19$ then
        f := (b and c) or ((not b) and d)
        k := 0x5A827999
    else if $20 \leq i \leq 39$
        f := b xor c xor d
        k := 0x6ED9EBA1
    else if $40 \leq i \leq 59$
        f := (b and c) or (b and d) or (c and d)
        k := 0x8F1BBCDC
    else if $60 \leq i \leq 79$
        f := b xor c xor d
        k := 0xCA62C1D6
    temp := (a leftrotate 5)+f+e+k+w(i)
    e := d
    d := c
    c := b leftrotate 30
    b := a
    a := temp
Add this chunk's hash to result so far:
$h0$ := $h0$+a
$h1$ := $h1$+b
$h2$ := $h2$+c
$h3$ := $h3$+d
$h4$ := $h4$+e digest=hash=h0 append h1 append h2 append h3 append h4 (expressed as big-endian)

In order to announce such a capability in Hello and DD packet, a new bit S (SHA-1) is introduced in the OSPFv3 packet's options field. This bit allows detecting if the neighbor is capable to bypass database exchange before sending its digest value. Organization of the OSPFv3 packet's options field in accordance with the present invention appears below:

```
         0                   1                   2
 0 1 2 3 4 5 6 7 8 9 0 1 2 3 4 5 6 7 8 9 0 1 2 3
-+-+-+-+-+-+-+-+-+-+-+-+-+----+---+---+---+---+---+---+---+----+
| | | | | | | | | | | | | |S|MT|AF|* |* |DC|R|N|MC|MC|E | V6 |
-+-+-+-+-+-+-+-+-+-+-+-+-+----+---+---+---+---+---+---+---+----+
```

To send a digest value in a DD packet, a new TLV is introduced in the LLS data block in order to carry a database digest value (DDV). The DDV carried in LLS is per LSA type.

SHA-1 is a 20-byte value that corresponds to digest computations of all LSAs having the same type. The absence of a given LSA type indicates that the router has no such a LSA in its LSDB. When two routers go to two-way state and decide to synchronize their database, initially they will go to Exstart (as in standard OSPF) to form a master/slave relationship. If the neighbor is capable (S bit set in DD packet) they exchange their DDV carried in a new TLV in the LLS. If the received value matches the local value, the event ExchangeDone is performed and the router goes into Full state. Otherwise router follow the normal exchange as specified in OSPF. Depending on per type LSA DDV, only a partial DD exchange could take place. If router R2 in the exchange is not capable (S bit clear in DD packet) router R1 send regular DD exchange packets.

Database Digest Value (DDV) is an SHA-1 digest computation of the local link state database 216. The computation is performed whenever there is a change in the database and it is performed incrementally. That is the previous value of the DDV and the changed element is used to calculate the new DDV. The DDV computation is performed per LSA type so that upon mismatch values, only certain LSA types are exchanged through DD packet therefore minimizing the number of DD packets.

A simple SHA-1 digest of the entire database does not meet the requirement of order-independent incremental updates. With SHA-1, digesting different orders of the same bytes will yield different results. Therefore the incremental digest will be constructed as a series of SHA-1 hashes, with the hash of each database entry XORed into the "running" incremental hash. In this way, two OSPF neighbors (routers R1, R2) can add and remove database entries in any order. Yet at any time if their databases 216 are identical they will each compute the same incremental digest. In the following pseudocode, router R1 incrementally computes a SHA-1 hash by adding database entries A, B, and C, after which it removes database entry B. Sha-1(A) XOR sha-1(B) XOR sha-1(C) adds database entries A, B and C to database 216. Sha-1(A) XOR sha-1(B) XOR sha-1(C) XOR sha-1(B) removes database entry B by creating the digest of B and XORing it into the incremental hash, thereby removing the original sha-1(B) from the incremental hash. Sha-1(A) XOR sha-1(C) yields the final result by performing the XOR of database entries A & C. The same operations can be made on peer router R2 but in a different order, as shown in the following example. sha-1(B) XOR sha-1(C) adds database entries B and C. sha-1(B) XOR sha-1(C) XOR sha-1(B) removes database entry B. sha-1(C) yields the result of performing an XOR of database entry C, and sha-1(C) XOR sha-1(A) adds database entry A to produce the final result. Since XOR is a transitive function, the resulting incremental digests computed by R1 and R2 will be identical.

SHA-1 was designed to be collision-resistant, and in particular, for two different random messages A and B, the probability that sha-1(A)=sha-1(B) is a very small value. This value is approximately 2 raised to the power of the number of bits in the hash. Since SHA-1 has 160 bits in its hash, the probability of a collision is 1 in $2^{160}$, which is $1 \times 10^{48}$, or 1 chance in a (trillion times a trillion times a trillion). That's accepted as pretty much collision resistant. Using XOR to combine SHA-1 to hash databases maintains this random collision resistance property. For two different random databases, the probability that they hash to the same value is still approximately 1 in $2^{160}$.

Compared to standard OSPF where the whole database gets exchanged when an adjacency comes up (even if the database is already synchronized) the present invention allows verified LSDB through SHA-1 digest values hence minimizing the DD exchange While a method and apparatus to minimize database exchange in OSPF by using a SHA-1 digest value has been explained and illustrated in detail, many changes and modifications to embodiments of the present invention can be made without departing from the spirit thereof.

What is claimed is:

1. A method of synchronizing router databases in a network, the method comprising:
    producing a first digest value incrementally from a first database that is local to a first router by conducting separate digest calculations on individual contents of the first database as additions and deletions are made to the first database and combining results of the separate digest calculations to form the first digest value;
    sending the first digest value to a second router;
    receiving a second digest value from the second router, the second digest value produced from a second database that is local to the second router;
    performing at least a partial database-synchronizing packet exchange with the second router if the first digest value is not within a range of difference from the second digest value; and
    transitioning the first router to a full state if the first digest value is within the range of difference from the second digest value.

2. The method of claim 1, wherein the first digest value is computed from link-state advertisements (LSAs) of a same type contained in entries of the first database.

3. The method of claim 1, wherein the first digest value is sent to the second router during a database description packet exchange between the first router and second router.

4. The method of claim 1, wherein the range of difference is zero.

5. The method of claim 1, wherein a difference between the first digest value and the second digest value indicates specific content in the first database to exchange with the second router.

6. The method of claim 5, wherein the specific content in the first database is exchanged with the second router during the at least partial database synchronizing packet exchange between the second router.

7. The method of claim 1, wherein the at least partial database synchronizing packet exchange comprises exchanging database description packets with the second router.

8. The method of claim 1 wherein at least some of the separate digest calculations use Secure Hash Algorithm-1 (SHA-1).

9. A first router, configured to synchronize a first database that is local to the first router to a second database located on a second router, comprising:
   means for producing incrementally a first digest value from the first database that is local to the first router by conducting separate digest calculations on individual contents of the first database as additions and deletions are made to the first database and combining results of the separate digest calculations to form the first digest value;
   means for sending the first digest value to the second router;
   means for receiving a second digest value from the second router, the second digest value produced from the second database that is local to the second router;
   means for performing at least a partial packet exchange with the second router if the first digest value is not within a range of difference from the second digest value; and
   means for transitioning the first router to a full state if the first digest value is within the range of difference from the second digest value.

10. The router of claim 9, wherein the first digest value is computed from LSAs of a same type contained in entries of the first database.

11. The router of claim 9, wherein the first digest value is sent to the second router during a database description packet exchange between the first router and second router.

12. The router of claim 9, wherein the range of difference is zero.

13. The router of claim 9, wherein a difference between the first digest value and the second digest value indicates specific content in the first database to exchange with the second router.

14. The router of claim 13, wherein the specific packets are exchanged with the second router during the at least partial database-synchronizing packet exchange between the second router.

15. The router of claim 9, wherein the at least partial database synchronizing packet exchange comprises exchanging database description packets with the second router.

16. A computer-readable medium containing instructions, which, when executed by a computer, synchronizes a first database that is local to a first router with a second database that is local to a second router, by performing the acts of:
   producing a first digest value incrementally from the first database that is local to the first router by conducting separate digest calculations on individual contents of the first database as additions and deletions are made to the first database and combining results of the separate digest calculations to form the first digest value;
   sending the first digest value to the second router;
   receiving a second digest value from the second router, the second digest value produced from the second database that is local to the second router;
   performing at least a partial database-synchronizing packet exchange with the second router if the first digest value is not within a first range of difference; and
   transitioning the first router to a full state if the first digest value is within a second range of difference from the second digest value.

17. An apparatus comprising:
   a communication connection configured to enable communication with a second apparatus;
   a first database configured to contain link state information; and
   a processor configured to
      incrementally calculate a first digest value by conducting separate digest calculations on individual contents of the first database as additions and deletions are made to the first database and combining results of the separate digest calculations to form the first digest value,
      compare the first digest value with a second digest value received from the second apparatus, the second digest value descriptive of a second database that contains link state information at the second apparatus,
      perform at least a partial database-synchronizing packet exchange with the second apparatus if the first digest value does not match the second digest value, and
      transition the first router to a full state if the first digest value matches the second digest value.

18. The apparatus of claim 17 wherein the apparatus is a first router and the second apparatus is a second router and the at least partial database-synchronizing packet exchange includes a database description packet exchange between the first router and the second router.

19. The apparatus of claim 17, wherein a difference between the first digest value and the second digest value indicates specific content in the first database to exchange with the second apparatus.

20. The apparatus of claim 19, wherein the at least partial database-synchronizing packet exchange exchanges the specific content in the first database with the second apparatus.

21. The apparatus of claim 17 wherein at least some of the separate digest calculations use Secure Hash Algorithm-1 (SHA-1).

* * * * *

UNITED STATES PATENT AND TRADEMARK OFFICE
CERTIFICATE OF CORRECTION

PATENT NO. : 7,664,789 B2
APPLICATION NO. : 11/292534
DATED : February 16, 2010
INVENTOR(S) : Mirtorabi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-eighth Day of December, 2010

David J. Kappos
*Director of the United States Patent and Trademark Office*